Patented May 29, 1951

2,555,284

UNITED STATES PATENT OFFICE 2,555,284

METHOD OF PLASTICIZING VINYLIDENE CHLORIDE POLYMERS

Arthur L. Besse, Jr., Lexington, Mass., assignor to Dewey and Almy Chemical Company, North Cambridge, Mass., a corporation of Massachusetts No Drawing. Application March 18, 1950, Serial No. 150,546

3 Claims. (Cl. 260—34.2)

This application is a continuation-in-part of my copending application Serial Number 79,909 filed March 5, 1949, now abandoned.

Among the difficulties which attend the production of formed shapes of "crystalline" vinylidene chloride polymers, the nonuniformity of monofilaments and the wrinkling of thin films have been serious.

Although the cause of these defects in the finished products has been exhaustively investigated, and changes have been made in factory polymer handling and extrusion to eliminate them, little progress has been made.

For sometime it was felt that the variability of monofilament and the wrinkling of the thin film were caused by small traces of moisture which had been absorbed upon or retained by the polymers. Procedures were introduced to assure the fact that when the polymer entered the extrusion machine no moisture was present. These precautions were found to be only partially effective in solving wrinkling and nonuniformity of filaments.

In the course of intensive work upon wrinkling, the curious fact was observed that if polymeric material which had been passed through the extruding machine but had produced a wrinkled product were subsequently shredded or disintegrated and then passed through the extruder a second time, the thin films produced were free of wrinkling. This discovery pointed to a method of making wrinkle-free crystalline polyvinylidene chloride films. Its practice is obviously out of the question because the cost of operation is beyond reason. A further difficulty is that vinylidene chloride polymers are difficult to extrude. The polymer decomposes at temperatures so close to temperatures which are developed in extrusion apparatus that local overheating is a constant danger. The breakdown of the resin following heating is exothermic and autocatalytic. Carbonization proceeds rapidly forming a cokey mass which jams the feed screw. Consequently heavy working of vinylidene chloride polymers is to be avoided if possible.

An analysis of the moisture content of one-time extruded films which wrinkled and second-time extruded films which remained flat showed an insignificant difference in moisture, well inside experimental error: consequently it seemed probable that the presence of water was not the cause of wrinkling but that the wrinkling was due to some characteristic of the polymer itself. After a prolonged investigation of the condition of the polymers, it seemed probable that the true cause of wrinkling was the presence of strips or irregularities in the film which were plasticized to higher and lower degrees, and that it was possible that the cause of wrinkling was the nonuniform absorption of the plasticizer by the particles of resin. The fact that twice extruded material produces unwrinkled films and uniform monofilaments could then be explained by assuming that the heating and intensive working in the second extrusion distributes the plasticizer more uniformly throughout the resin and causes its absorption in a more uniform manner.

Working on this hypothesis, powdered resin was sprayed with plasticizer in order to distribute the plasticizer as uniformly as possible and the mixture was then run through a cone blender to complete the distribution. Subsequently the sprayed and blended product was heated in a hot air oven, but even though the temperatures were carried up to a point where a significant portion of the plasticizer was vaporized, uniform absorption did not occur. The procedure was open to two objections: one, due to the low scorching temperature of vinylidene chloride polymers, there was a scorching hazard and, second, even though the heat was carried up to the danger point, plasticization was not uniform.

In an attempt to determine what part of a polymer granule resisted solvation, particles of plasticizer-wet polymer were irradiated with infra-red light for varying times and it was found that, after irradiation, solvation of the whole resin particle progressed properly. It thus appeared that the particles of resin were composed of at least two types of molecules, those molecules occupying the surface layer being more insoluble than those in the interior of the particle.

Subsequent experiment showed that by exposing the plasticizer-wet granules to controlled amounts of infra-red radiation it was possible to raise the surface temperature of the granule to a degree sufficient to solvate the resistant surface without at the same time raising the mass temperature of the resin particle to any dangerous temperature level where degradation of the resin takes place.

There are numerous ways of irradiating a mass of moving particles. The particles may be moved under the lamps on a vibrating belt, or lamps may be placed about the axis of rotation of a tumbling barrel or blender. The irradiation device forms no part of this invention. However, the specific apparatus and method used is described by way of example: Small particles of polymer are placed in a cone blender and plasticizer is sprayed over the moving particles. After the desired amount of plasticizer, from 2 to 12% and usually about 8% by weight based on the weight of the polymer, has been added, the blender is run until the distribution is uniform. The coated particles are then transferred to the irradiation apparatus in which a metal plate about 15 inches wide and about 40 inches long inclined at an angle to the horizontal and vibrated with an electric vibrator energized with alternating current provides the moving element. The plate violently agitates all particles on its surface and feeds them down the incline. The polymer feed to the plate is regulated to maintain a moving bed between $1/8$ and $3/8$ inch, preferably $5/32$ of an inch, deep. This depth permits all particles at all times to be in violent churning motion.

A bank of infra-red lamps is arranged above the plate at an average distance of approximately 12 inches above the bed. The lamps are adjusted so that all areas of the plate receive as equal quantities of radiation as possible. The lamps are so spaced that the electrical input into the lamps is between 4 and 6 watts per square inch of surface of the plate. The lamps which have been used are General Electric Type R40 which are stated to produce radiation in the range between 4,000 and 20,000 Angstrom units with the maximum output at a frequency of about 10,000 Angstrom units. It is calculated from the rise of the mass temperature of the material passing under the infra-red lamps, that the effective intensity of the radiation, i. e., the radiation actually absorbed by the material, is between 1 and 2 watts per square inch of the surface area of the plate. Although the precise cause of this energy loss is unknown, it may easily be attributed to the energy losses in the lamp and to heat losses through the bottom plate and side walls of the apparatus.

When a feed rate under the lamps of from 45 to 120 pounds per hour of polymer granules having a bulk density of 18-32 pounds per cubic foot is maintained, the very thin surface layers on the particles are raised to a high enough temperature to solvate readily, yet the mass temperature is not increased to a dangerous degree. It usually is quite possible to hold one's hand in the stream of polymer without discomfort. No advantage is found in raising the mass temperature above 150° F. The mass temperature limit of the process is, of course, the beginning degradation point of the resin (usually, but not always, about 225° F.). There is, seemingly, no necessity for approaching this limit. If the energy actually received by the material exceeds 15 watt hours per pound, degradation of the resin results. The minimum amount of energy necessary to promote the desired solvation is about 5 watt hours per pound of material.

Although the irradiated polymer may be run directly to the extrusion machine, better products, particularly when very thin or small sections are to be made, are secured by "resting" the treated polymer, preferably by storing it in hermetically sealed drums, after the irradiation treatment. During storage a more uniform distribution of the plasticizer occurs. Using the degree of wringling of a film of vinylidene-vinyl chloride copolymer 1 mil thick as a measurement criterion, we find that polymer run directly from the lamps to the extruder shows a very small wrinkle. Polymer stored 4 hours at room temperature is completely acceptable, but with a slight degree of wrinkle that could be described as residual. Careful examination, as by strain patterns of film made from polymer stored progressively up to 48 hours shows a very slight progressive improvement in uniformity. No further improvement is noted if the polymer is stored for longer periods. The polymer may be run through the extruder at any later time factory convenience dictates, but for the purposes of this invention, storage beyond 48 hours at room temperature has no effect.

The procedure has been found useful in the following combinations:

| Resin | Plasticizers |
|---|---|
| Polyvinylidene chloride. | Ethyl phthalyl ethyl glycolate. |
| Vinylidene-vinyl chloride copolymer. | Di-isobutyl adipate. |
| Vinylidene chloride-vinyl ester copolymer. | Di-cyclohexyl adipate. |
| Vinylidene-vinyl chloride-vinyl cyanide tripolymer. | Di-(3,5,5, tri-methyl-hexyl) adipate. |
| (All polymers possessed super-cooling characteristics.) | Di-(3,5,5, tri-methyl-hexyl) di-glycolate. |
| | Di-n-decyl adipate. |

The proportion of plasticizer to the resin varies according to the service the product is to perform. The most usual proportions lie between 2 and 12% of plasticizer to resin by weight.

The process produces smooth, uniform final products. Its cost is low and no degradation of the polymer occurs.

The term "vinylidene chloride polymer" used in the specification and claims is intended to cover polymers, copoylmers, and tripolymers of vinylidene chloride as listed above and is confined to those polymeric forms of vinylidene chloride which exhibit the property of super-cooling.

I claim:

1. A process for plasticizing a normally crystalline vinylidene chloride polymer capable of super-cooling, said process producing a plasticized resin capable of forming extrusions which remain dimensionally uniform and unwrinkled, which includes spreading a film of a plasticizer for said resin over finely divided particles of the resin, the total weight of the plasticizer being between 2 and 12% of the weight of the resin, arranging the particles upon a supporting member in a layer $1/8$ to $3/8$ inch thick, violently agitating the particles and simultaneously exposing the particles to infra-red radiation with an effective intensity of 1 to 2 watts per square inch of surface area of said supporting member for a time sufficient that the total absorbed radiation be between 5 and 15 watt-hours per pound of resin, said quantity of radition heating the surface of the resin particles to a degree sufficient to solvate the molecules of said surface but insufficient to raise the mass temperature of the particles to the degradation point.

2. A process for plasticizing a normally crystalline vinylidene chloride polymer capable of super-cooling, said process producing a plasticized resin capable of forming extrusions which remain dimensionally uniform and unwrinkled, which includes spreading a film of a plasticizer for said resin over finely divided particles of the resin, the total weight of the plasticizer being between 2 and 12% of the weight of the resin, arranging the particles upon a supporting member in a layer $1/8$ to $3/8$ inch thick, violently agitating the particles and simultaneously exposing the particles to infra-red radiation with an effective intensity of 1 to 2 watts per square inch of surface area of said supporting member for a time sufficient that the total absorbed radiation be between 5 and 15 watt-hours per pound of resin, said quantity of radiation heating the surface of the resin particles to a degree sufficient to solvate the molecules of said surface but insufficient to raise the mass temperature of the particles to the degradation point and storing the polymer for a period of 4 to 48 hours at room temperature to increase the uniformity of the product prior to extrusion.

3. A process of producing extrusions of a normally crystalline vinylidene chloride polymer capable of super-cooling said extrusions remaining dimensionally uniform and unwrinkled which includes spreading a film of a plasticizer for said resin over finely divided particles of the resin, the total weight of said film of plasticizer being between 2 and 12% of the weight of the resin, arranging the particles upon a supporting member in a layer $\frac{1}{8}$ and $\frac{3}{8}$ inch thick, violently agitating the particles and simultaneously exposing the particles to infra-red radiation with an effective intensity of 1 to 2 watts per square inch of surface area of said supporting member for a time sufficient that the total absorbed radiation be between 5 and 15 watt-hours per pound of resin, said quantity of radiation heating the surface of the resin particles to a degree sufficient to solvate the molecules of said surface but insufficient to raise the mass temperature of the particles to the degradation point, storing the polymer for a period of 4 to 48 hours at room temperature to increase the uniformity of the product and subsequently extruding the polymer in the form desired.

ARTHUR L. BESSE, Jr.

No references cited.